United States Patent
Bandic et al.

(10) Patent No.: US 8,874,875 B2
(45) Date of Patent: Oct. 28, 2014

(54) ICC-NCQ COMMAND SCHEDULING FOR SHINGLE-WRITTEN MAGNETIC RECORDING (SMR) DRIVES

(75) Inventors: Zvonimir Z. Bandic, San Jose, CA (US); Cyril Guyot, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 176 days.

(21) Appl. No.: 13/537,293

(22) Filed: Jun. 29, 2012

(65) Prior Publication Data

US 2014/0006707 A1    Jan. 2, 2014

(51) Int. Cl.
*G06F 12/10* (2006.01)
*G06F 12/02* (2006.01)

(52) U.S. Cl.
CPC .................................. *G06F 12/0292* (2013.01)
USPC ........................................................ 711/202

(58) Field of Classification Search
None
See application file for complete search history.

(56) References Cited

U.S. PATENT DOCUMENTS

| | | |
|---|---|---|
| 6,185,063 B1 | 2/2001 | Cameron |
| 6,378,037 B1 * | 4/2002 | Hall .............................. 711/113 |
| 6,967,810 B2 | 11/2005 | Kasiraj et al. |
| 7,603,530 B1 | 10/2009 | Liikanen et al. |
| 2005/0071537 A1 | 3/2005 | New et al. |
| 2005/0166013 A1 * | 7/2005 | Espeseth et al. .............. 711/112 |
| 2006/0232874 A1 * | 10/2006 | Tsuchinaga et al. ............ 360/75 |
| 2007/0183071 A1 | 8/2007 | Uemura et al. |
| 2010/0011149 A1 * | 1/2010 | Molaro et al. ................ 711/103 |
| 2010/0205623 A1 | 8/2010 | Molaro et al. |
| 2010/0232057 A1 | 9/2010 | Sanvido et al. |

\* cited by examiner

*Primary Examiner* — Duc Doan

(74) *Attorney, Agent, or Firm* — G. Marlin Knight

(57) ABSTRACT

ICC-NCQ priority and deadline information in conjunction with an estimation of command access time that is specific to SMR drives are used improve command queue optimization. Estimated completion times are determined based on the internal subcommands that the drive has to execute to complete the host read or write command taking into account whether all or part of the data will be or already is stored in write-twice cache, E-region and/or I-region. The command processor selects the next command for execution based on calculated access times with adjusted priority based on the specified deadline for the command. As the deadline approaches, the priority of the command increases. For high priority data writes as specified by a host, an optimized storage plan is selected as appropriate using the "write-twice cache" (WTC) region, E-region or I-region.

10 Claims, 4 Drawing Sheets

ICC-NCQ COMMAND SCHEDULING FOR SHINGLE-WRITTEN MAGNETIC RECORDING (SMR) DRIVES

RELATED APPLICATION

A commonly assigned patent application filed on Jul. 18, 2011 bearing Ser. No. 13/135,953, which is hereby incorporated by reference, describes SMR drive embodiments with write-twice cache regions that are mentioned in the present application.

FIELD OF THE INVENTION

The invention relates to the field of data storage device architecture using indirection for mapping physical storage locations to logical addresses and more particularly such indirection used in shingle-written magnetic recording (SMR) devices.

BACKGROUND

Conventional disk drives with magnetic media organize data in concentric tracks that are spaced apart. The concept of shingled writing is a form of magnetic recording and has been proposed as a way of increasing the areal density of magnetic recording. In shingle-written magnetic recording (SMR) media a region (band) of adjacent tracks are written so as to overlap one or more previously written tracks. The shingled tracks must be written in sequence unlike conventionally separated tracks, which can be written in any order. The tracks on a disk surface are organized into a plurality of shingled regions (also called I-region) which can be written sequentially from an inner diameter (ID) to an outer diameter (OD) or from OD to ID. Once written in the shingled structure, an individual track cannot be updated in place, because that would overwrite and destroy the overlapping tracks. Shingle-written data tracks, therefore, from the user's viewpoint are sometimes thought of like append-only logs. To improve the performance of SMR drives, a portion of the media is allocated to a so-called "exception regions" (E-regions) which are used as staging area for data which will ultimately be written to an I-region. The E-region is sometimes referred to as an E-cache.

Address indirection in the shingle-written storage device's internal architecture is useful to emulate existing host interfaces at least to some extent and shield the host from the complexities associated with SMR. Conventionally host file systems use logical block addresses (LBAs) in commands to read and write blocks of data without regard for actual locations (physical block address (PBA)) used internally by the storage device. Hard disk drives have had some level of LBA-PBA indirection for decades that, among other things, allows bad sectors on the disk to be remapped to good sectors that have been reserved for this purpose. Address indirection is typically implemented in the controller portion of the drive's architecture. The controller translates the LBAs in host commands to an internal physical address, or something closer to a physical address.

The conventional LBA-PBA mapping for defects does not need to be changed often. In contrast, in an SMR device the physical block address (PBA) of a logical block address (LBA) can change frequently depending on write-history. For example, background processes such as garbage collection move data sectors from one PBA to another but the LBA stays the same. The indirection system for SMR is a natively dynamic system in which the controller translates host address requests to physical locations. In a SMR system, the LBA-PBA mapping generally changes with every write operation because the system dynamically determines the physical location on the media where the host data for an LBA will be written. The same LBA will usually be written to a different location the next time the host LBA is updated. The indirection system provides a dynamic translation layer between host LBAs and the current physical locations on the media.

SMR drives rely on indirection to mitigate some of the performance impact due to the extra constraints brought by shingled writing. The indirection scheme however requires regular garbage collection which causes command completion times to be somewhat higher for some benchmarks than on standard PMR drives.

Various protocols have been developed in the prior art to allow hard disk drives to optimize their operations by taking actions based on knowledge that is available to the drive. For example, Native Command Queuing (NCQ) is an extension of the standard Serial ATA protocol which allows disk drives to optimize performance by executing commands in an order other than as sequentially received. However, the additional freedom exercised by the drive can in some circumstances caused undesirable results and create timing issues for the host. Further protocols are needed to constrain the operations of the drive when required by the host. Isochronous command completion (ICC) protocol allows the host to send a time limit for completion of specific read or write commands to hard drive. See for example, US published application 20100011149 by Molaro, et al., Jan. 14, 2010 which describes "deadlines" for queued read and write commands that can be advisory or hard deadlines. The host specifies the deadlines in the read and write commands.

SUMMARY OF THE INVENTION

Embodiments of the invention use ICC-NCQ priority and deadline information in conjunction with an estimation of command access time that is specific to SMR drives to improve command completion times on SMR drives for those commands. Embodiments use additional information specific to SMR architecture to compute estimated latency based on the internal subcommands that the drive has to execute to complete the host read or write command. The command processor in the drive keeps a queue of pending commands and selects the next command for execution based on calculated access times with adjusted priority based on the specified deadline. As the deadline approaches the priority of the command increases.

For high priority data writes as specified by a host, the method selects an optimized storage plan from the following options: a) write the data immediately on an available "write-twice cache" (WTC) region on the disk; b) write the data to an E-region if available without the need to perform defragmentation; or c) write the data to an I-region if E-Region by-pass is enabled.

In prior art the command completion time (CCT) for a PMR drive was a simple computation of rotational latency and seek latency. A block of consecutive LBAs may not be stored consecutively by an SMR drive, so additional seeks may be required, which can increase the execution time. In embodiments of the invention dead-lined reads are ordered based on estimated command completions times (CCT) computed from read fragmentation through the indirection system. In addition, the execution by an SMR drive of a single write command from a host can require multiple internal actions including multiple writes (with associated seeks) to a write cache, an E-region, an I-region, etc. Therefore, total command completion time (CCT) for an SMR drive involves a series of subcommands, which vary depending on the organizational state of data at the time, e.g. how much garbage has accumulated in the E-region, write-twice cache (WTC) availability, etc.

In embodiments of the invention, dead-lined writes are staged either into WTC or E-region or I-track (thorough bypass), based on the deadline information. Use of WTC give fast writes up to a limited amount provided by the size of the cache. The E-region allows a reasonably fast write as long as garbage collection has been done recently. Writes to the I-region are generally slow, but even here these writes may be faster when sequential bypass is possible.

E-region writes that require de-staging of previous data to an I-region trigger a significant amount of data movement and are, therefore, slow. These writes can be used for "best effort traffic."

When unexecuted commands in the queue reach the specified deadline, they should be given priority over background garbage collection algorithms.

DETAILED DESCRIPTION OF THE INVENTION

Figure 1:
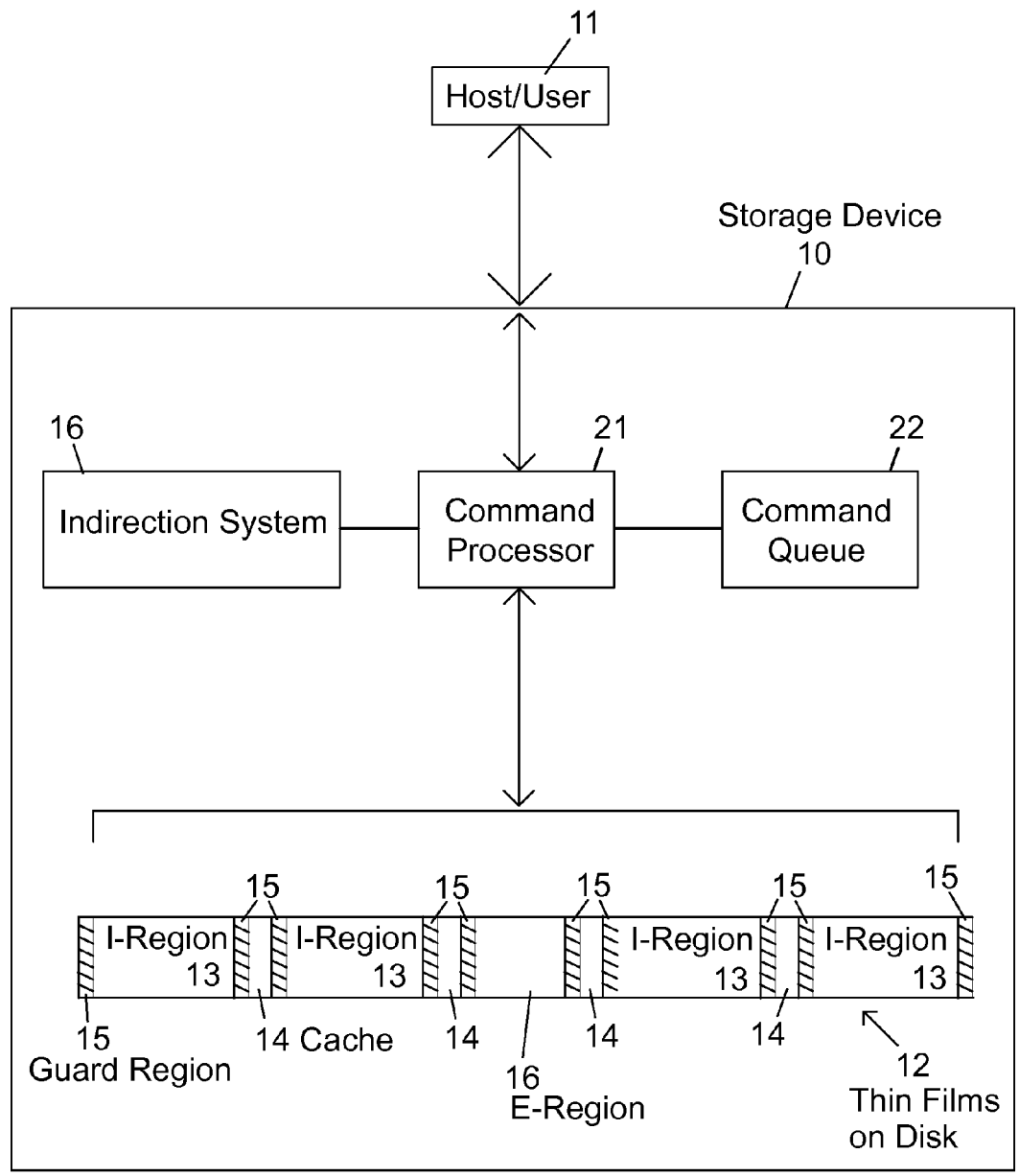
FIG. 1 is an illustration of a data storage device with a command processing system according to an embodiment of the invention.

FIG. 1 is an illustration of a data storage device (DSD) 10 using SMR with a command processor 21 and command queue 22 according to an embodiment of the invention. The command processor 21 functions according to the prior art except as described herein, and aspects of the system that perform prior art functions are not shown. The pending list of unexecuted commands is stored in command queue 22. The commands can be execution in nonsequential based on the algorithms described below. The system electronics can be included in a prior art system-on-a-chip, which is an integrated circuit that includes the command processor 21, the indirection system 16 command queue 22, as shown as well as prior art host interface, controller, servo functions, microprocessor, firmware programs, etc. all in a single chip.

The host/user 11 can be any type of computer-like device and can communicate with the drive by any means including through a network. The term "user" will be used interchangeably with "host." Multiple hosts can also communicate with the drive using prior art techniques. Thin films 12 are magnetic thin film coatings, which typically are deposited on both upper and lower surfaces of a hard disk (not shown) and a drive can also have multiple disks. The films 12 are shown in FIG. 1 in cross section view. In a plan view, the regions are a plurality of concentric circular bands. The magnetic thin films are formatted for use in an SMR architecture and in this embodiment include disk E-region 16, I-regions 13 (also called I-track regions), write cache regions 14 (also called write-twice cache regions), and guard regions or bands 15. Although only one is shown in FIG. 1, a device can have multiple E-regions 16 on each disk surface, and there are usually multiple disk surfaces.

Indirection system 16 manages the mapping of logical block addresses (LBAs) that are contained in host commands to internal storage addresses used by the drive. As noted the SMR architecture can store data for an LBA in a variety of regions that can change as the drive moves the data around. The host 11 sends read and write commands that reference standard logical block addresses (LBAs). In a SMR drive architecture as described herein, an LBA can be assigned to a write-twice cache, an E-region or an I-region, which complicates the task indirection mapping.

Figure 2:
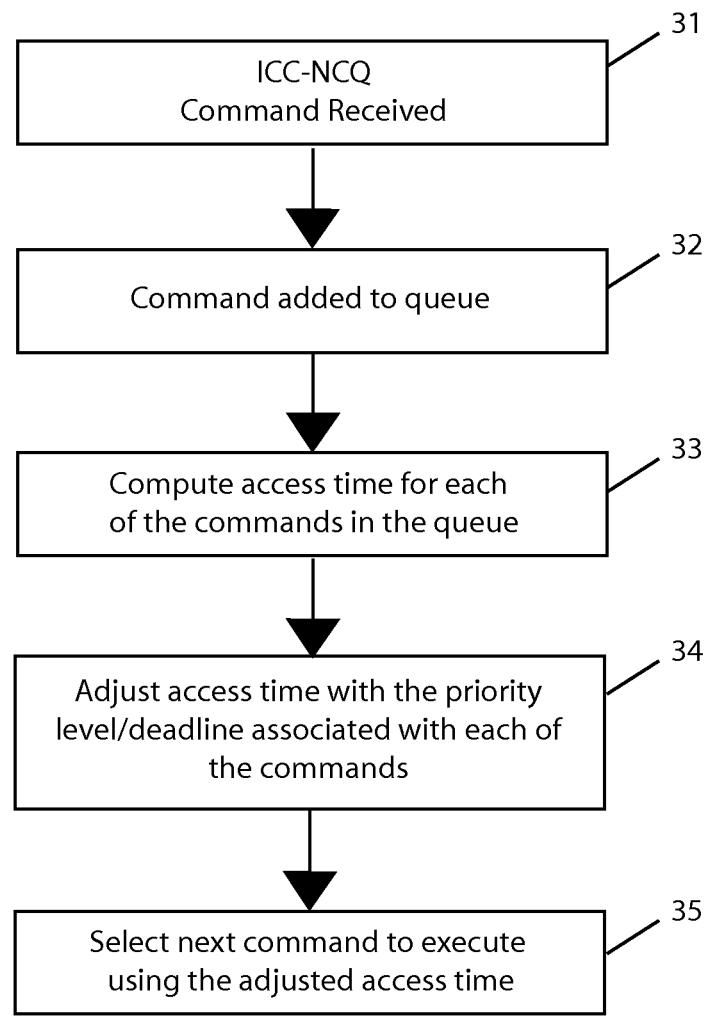
FIG. 2 is a flow chart illustrating a method of processing ICC-NCQ commands according to the prior art.

FIG. 2 is a flow chart illustrating a method of processing ICC-NCQ commands according to the prior art. The ICC-NCQ command is received 31 and added to the command queue 32. In this case the command can be a read or write command. The ICC-NCQ protocol allows the host to set the priority level and deadline for each command. This information will be referred to as part of the command itself, so when the "command" is placed in the queue that includes the priority level and deadline information. The estimated access time for each command in the queue is computed 33 without regard to indirection. The access time is further processed or adjusted by using the priority level/deadline associated with each command 34. The adjusted access time is then used as the criterion for selecting the best choice as next command to execute from the queue 35.

Figure 3:
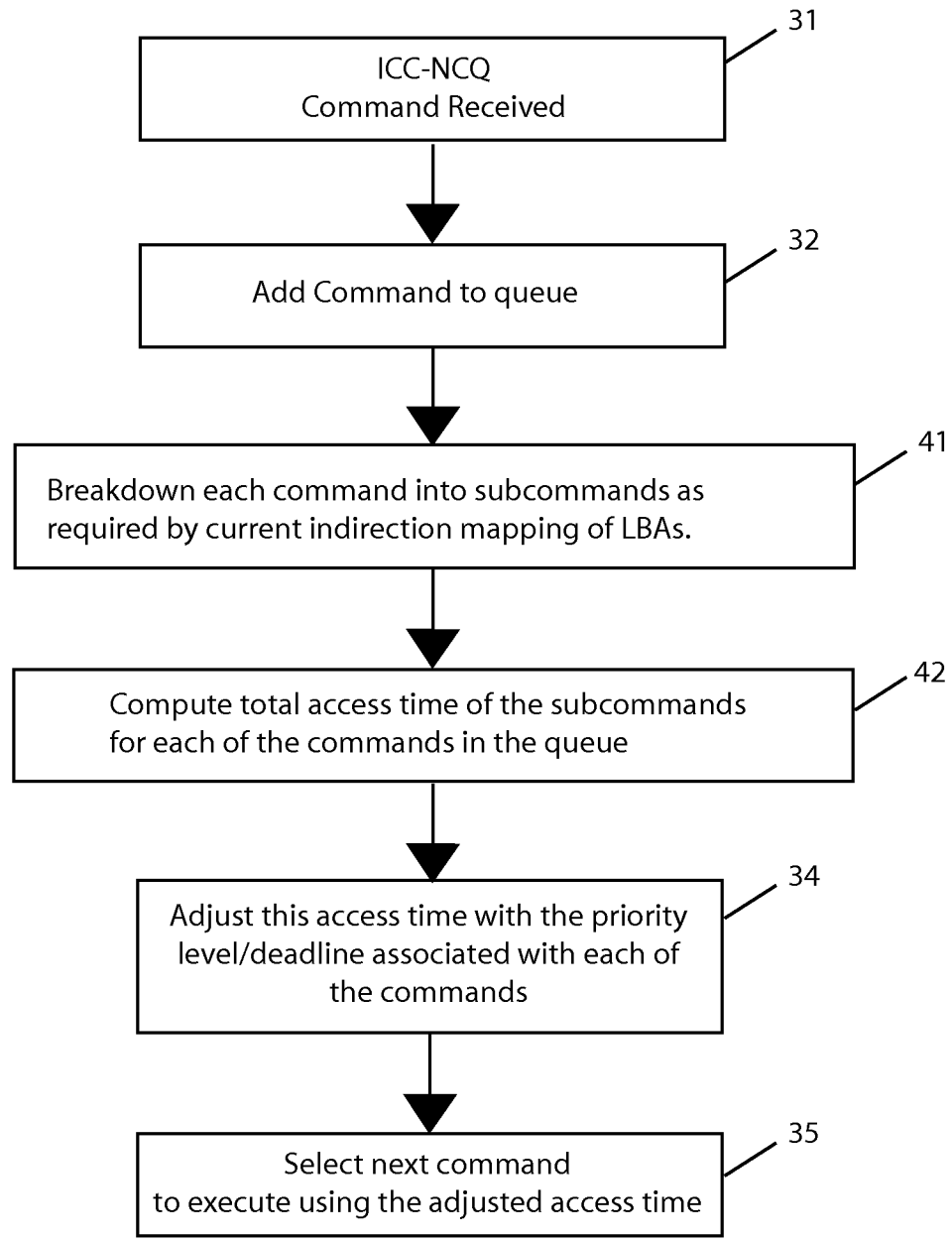
FIG. 3 is a flow chart illustrating a method of processing an ICC-NCQ read command according to an embodiment of the invention.

FIG. 3 is a flow chart illustrating a method of processing an ICC-NCQ read command according to an embodiment of the invention. The aspects that are the same of the prior art are referred to the with the same reference number used in FIG. 2. This embodiment includes additional steps not included in the prior art in the process of estimating the access time for the command. A set of subcommands that will be required to for the drive to complete the host read command is determined based on the current indirection mapping 41. As noted above, in the SMR architecture the physical data blocks for a logical block of LBAs may not be contiguous and portions can be in I-regions, E-regions and write-twice cache regions. A read command for a block of LBAs, therefore, can require more seek operations than might be required by a traditional disk drive. For example, in a simple case for a read command for two consecutive LBAs that are stored in different locations, e.g. one in WTC and one in an I-region, the drive has to execute subcommands including two seeks and two reads. Once the required set of subcommands (including seeks and reads) is determined for the full set of LBAs requested, the access time for each subcommand can then be estimated using standard principles. The method then uses the total access time for the set of subcommands as the estimated access time for the host read command 42. Because the SMR drive can be reorganizing its stored data between the execution of host commands, the total access time for each command in the queue may be re-computed when a command is being selected for execution.

Figure 4:
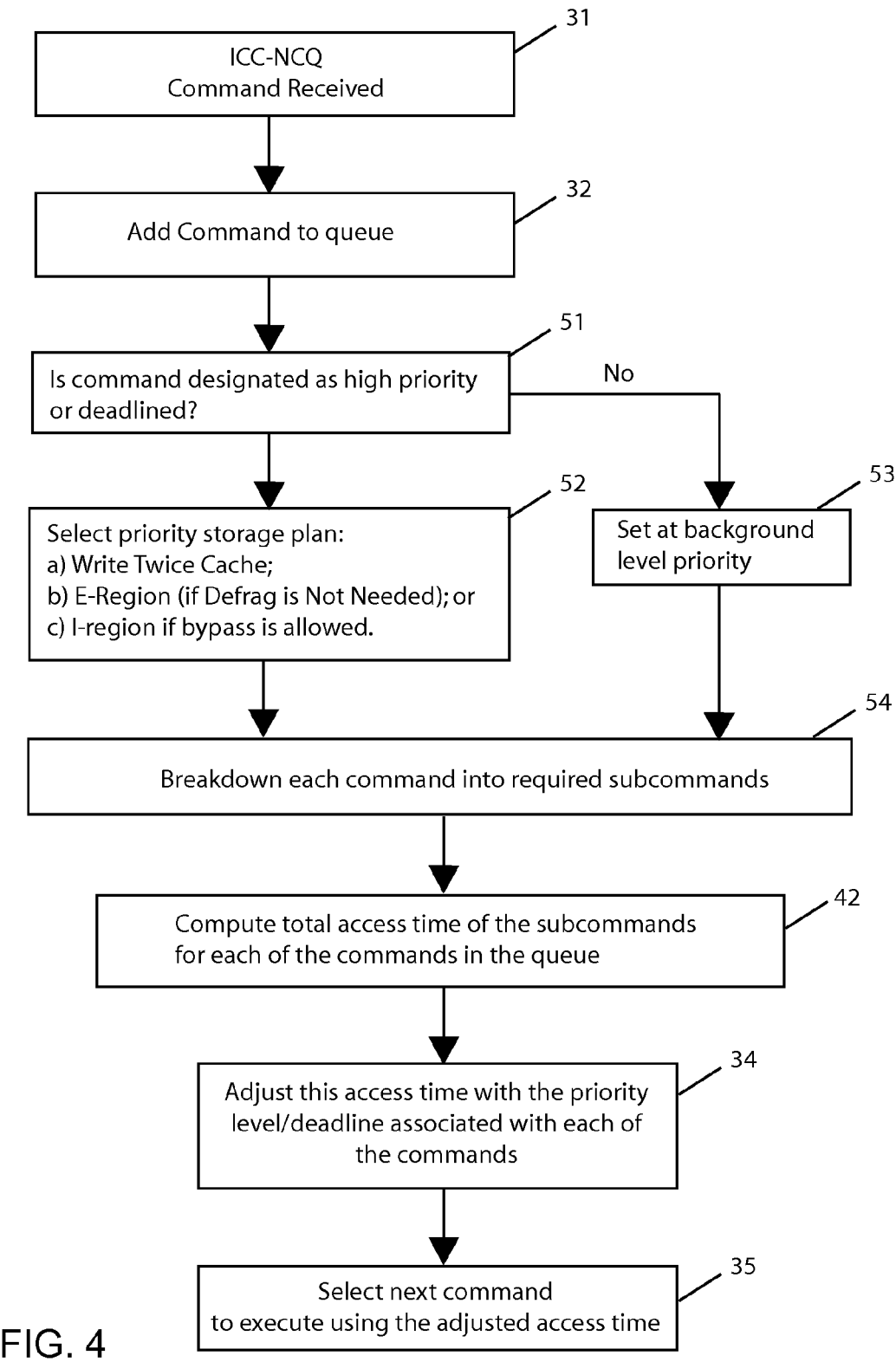
FIG. 4 is a flow chart illustrating a method of processing an ICC-NCQ write command according to an embodiment of the invention.

FIG. 4 is a flow chart illustrating a method of processing an ICC-NCQ write command according to an embodiment of the invention. In this embodiment the method determines whether the command has been designated by the host as high priority or assigned a deadline 51. In an embodiment of the invention the priority can be a separate field in the command from the deadline and the deadline can be an absolute time from the reception of the command. If the host has not designated priority or deadline, then the priority is set to background level 53, i.e. the lowest priority or storage plan. This is sometimes referred to as a "best efforts" priority.

For a command that has been designated by the host as high priority or assigned a deadline, the command processor selects an internal storage plan based on the available resources and current status 52. If a write-twice cache region is available, then this is the fastest storage plan and is preferred. The next best is writing to an E-region if defragmentation is not first required. The next best storage plan is to write to an I-region in which "sequential bypass" is allowed. Preferably sequential bypass is an option for the drive which allows data to be written directly to an I-region in any location where it would not overwrite data. In this case the requirements of sequential writing are bypassed which allows increased efficiency in the short term for the particular write command by trading off increased work for the drive later on. If none of the priority storage options are available, then the drive controller may not be able to satisfy the deadline requirement set by the host: depending on configuration, and the drive controller may decide to either abort execution of such a command, or treat it in a "best effort" manner.

Once the storage plan has been selected for a write command, the set of required subcommands can be determined 54. The access time for each subcommand can then be estimated using standard principles and the total access time for the command is the sum of the subcommands times 42. The adjustment of the access time according to the standard principles can then be performed 34.

The cache regions 14 can be aligned on the upper and bottom surfaces of the disk or staggered. Only a few cache regions are shown, but the actual number of cache regions can be much larger in embodiments of the invention. The number of cache regions should be much higher than the number of E-regions, and generally the E-regions will be much larger than the cache regions. A higher number of cache regions reduces the seek time needed for the head to get to the nearest cache region, but the design trade-off is that increased disk space is taken away from the user data regions.

A design goal for the cache regions is to provide areas on the media where the device can quickly store data in nonvolatile form with nonsequential writing which allows low system overhead. In contrast writing to an E-region generally requires higher system overhead for defragmentation, etc. E-regions will generally hold data for a longer period of time than the cache regions depending on factors such as how long it takes to defragment an I-region.

For increased performance the cache regions should be sparsely populated, so they can be written soon after the head settles onto a track after seeking from another location. The cache regions are generally used for short term temporary storage until writing to the E-region occurs based on the drive's caching algorithms. For example, writing to the E-region might occur when sufficient commands/data accumulate to make the per-command execution cost of writing in the E-region minimal.

The cache regions are generally created at predetermined locations on the disks as a part of the process of formatting the disks during the manufacturing process. However, in alternative embodiments cache regions can be dynamically created to improve performance under certain conditions, for example, to take advantage of otherwise free or unused space on the device. The dynamically created cache regions can also be removed as needed to allow the media space to be used for shingled data regions.

The guard bands or regions 15 are used at each transition between shingled data tracks to unshingled tracks. A guard region 15 can be the width of a single data track or two or more data tracks, and it is used to avoid data overwrites as SMR write heads are wider than data tracks. Each guard region is a set number of data tracks wide, whether located at the inner diameter to outer diameter of the disk. However, the required width for each guard region changes across the radius of disk due to changes in the angle of the head from the mechanical rotation of head (slider) around the pivot point of the actuator. Thus, the necessary distance required for the guard band at the inner diameter might be wider than at the outer diameter or middle diameter. Guard bands are virtual structures from a read/write standpoint, i.e. no corresponding physical structure is needed in the thin film magnetic material. The device's firmware ensures that the guard bands are not written by reserving selected regions on each disk surface.

The invention claimed is:

1. A method of operating a data storage device the method comprising:
   adding a read command received from a host to a command queue, the command queue already having at least one previously received command stored therein;
   for each logical block address (LBA) specified in the read command determining whether a storage location for the LBA is currently in a write-twice cache, an E-region or an I-region as mapped in an indirection system, determining a set of subcommands, including a number of seek commands, required to retrieve all of the logical block addresses (LBAs),
   estimating a completion time for the read command by adding together estimated completion times for the set of subcommands; and
   selecting a next command from the command queue for execution based at least in part on the completion time for the read command.

2. The method of claim 1 wherein the read command received from the host includes a deadline, and selecting a next command from the command queue for execution further comprises using the deadline for the command to give priority to a command that has a closest deadline.

3. The method of claim 1 wherein the read command received from the host is an Isochronous command completion (ICC)-Native Command Queuing (NCQ) NCQ type command.

4. A method of operating a data storage device the method comprising:
   adding a write command with data received from a host to a command queue, the write command being specified as high priority by the host and the command queue already having at least one previously received command stored therein;
   selecting a storage plan as a) storing the data in a write-twice cache, b) storing the data in an E-region that does not require defragmentation, or c) storing the data in I-region using sequential bypass;
   determining a set of subcommands required to write all of the logical block addresses (LBAs) according to the storage plan, estimating a completion time for the write command by adding together estimated completion times for the set of subcommands; and
   selecting a next command from the command queue for execution based at least in part on the completion time for the write command.

5. The method of claim 4 wherein the write command received from the host includes a deadline, and selecting a next command from the command queue for execution further comprises using the deadline for the command to give priority to a command that has a closest deadline.

6. The method of claim 4 wherein the write command received from the host is an Isochronous command completion (ICC)-Native Command Queuing (NCQ) NCQ type command.

7. A data storage device comprising:
- a set of storage regions including write-twice cache regions, E-regions and I-regions;
- an indirection system that maps logical block addresses (LBAs) in host commands to write-twice cache regions, E-regions and I-regions; and
- a command processor that receives read and write commands from a host specifying LBAs and stores the read and write commands in a command queue, the command processor including means for determining using the indirection system whether the a received command requires accessing one or more of the write-twice cache regions, E-regions or I-regions, determining a set of subcommands required to complete each received command, estimating a completion time for each received command by adding together estimated completion times for the set of subcommands, and selecting a next command for execution based at least in part on the completion time for each received command in the queue.

8. The data storage device of claim 7 wherein the received command includes a deadline, and the command processor selects the next command from the command queue for execution using the deadline for the command to give priority to a command that has a closest deadline.

9. The data storage device of claim 7 wherein the received command is an Isochronous command completion (ICC)-Native Command Queuing (NCQ) NCQ type command.

10. The data storage device of claim 7 wherein the means for determining a set of subcommands required to complete each command further comprises means for determining a number of seeks required to access all of the LBAs specified in the received command.

\* \* \* \* \*